United States Patent
Tobias et al.

(10) Patent No.: US 6,873,877 B1
(45) Date of Patent: Mar. 29, 2005

(54) DISTRIBUTED PRODUCTION SYSTEM FOR DIGITALLY ENCODING INFORMATION

(75) Inventors: Martin Tobias, Seattle, WA (US);
Beverley Kite, Seattle, WA (US);
Mathews Brown, Seattle, WA (US);
Eric Lindvall, Seattle, WA (US);
Jeffrey Oberlander, Seattle, WA (US);
Aron Roberts, Seattle, WA (US); Anna Hansen, Port Angeles, WA (US);
Gregory Malley, Seattle, WA (US);
Ken Suzuki, Seattle, WA (US)

(73) Assignee: Loudeye Corp., Seattle, WA (US)

( * ) Notice: Subject to any disclaimer, the term of this patent is extended or adjusted under 35 U.S.C. 154(b) by 0 days.

(21) Appl. No.: 09/499,961

(22) Filed: Feb. 8, 2000

Related U.S. Application Data (60) Provisional application No. 60/156,817, filed on Sep. 29, 1999, provisional application No. 60/120,209, filed on Feb. 11, 1999, provisional application No. 60/120,207, filed on Feb. 11, 1999, provisional application No. 60/120,208, filed on Feb. 11, 1999, and provisional application No. 60/119,762, filed on Feb. 11, 1999.

(51) Int. Cl.$^7$ ............................................. G06F 17/00
(52) U.S. Cl. .................. 700/94; 379/101.01; 707/104.1
(58) Field of Search ................... 700/94, 4; 348/716, 348/441; 379/93.15, 101.01, 102.01; 707/104.1; 709/247, 246; 381/61; 84/604, 605

(56) References Cited

U.S. PATENT DOCUMENTS

| | | | |
|---|---|---|---|
| 5,001,702 A | 3/1991 | Teraslinna et al. ............. 370/60 |
| 5,557,749 A | 9/1996 | Norris .................... 395/200.18 |
| 5,706,434 A | 1/1998 | Kremen et al. ......... 395/200.09 |
| 5,737,595 A | 4/1998 | Cohen et al. ................ 395/611 |
| 5,848,415 A | 12/1998 | Guck .......................... 707/10 |
| 5,862,228 A * | 1/1999 | Davis ........................... 381/17 |
| 5,928,377 A | 7/1999 | Doran et al. ................. 714/786 |
| 5,940,504 A | 8/1999 | Griswold ........................ 380/4 |
| 5,956,729 A | 9/1999 | Goetz et al. ................. 707/104 |
| 6,185,625 B1 * | 2/2001 | Tso et al. .................... 709/247 |
| 6,421,733 B1 * | 7/2002 | Tso et al. .................... 709/246 |
| 6,529,146 B1 * | 3/2003 | Kowalski et al. ............. 341/50 |
| 6,594,699 B1 * | 7/2003 | Sahai et al. .................. 709/228 |
| 6,601,056 B1 * | 7/2003 | Kagle et al. .................... 707/1 |
| 6,614,801 B1 * | 9/2003 | Parnes ......................... 370/465 |
| 6,615,252 B1 * | 9/2003 | Oka et al. .................... 709/219 |
| 2002/0120634 A1 * | 8/2002 | Min et al. .................... 707/200 |
| 2003/0033331 A1 * | 2/2003 | Sena et al. ................... 707/513 |

FOREIGN PATENT DOCUMENTS

WO    WO 96/41285    12/1996    ........... G06F/17/30

OTHER PUBLICATIONS

PCT Search Report PCT/US 00/03414 dated Jul. 31, 2000.
WO 96 41285 A (Intervu Inc) Dec. 19, 1996 p. 9, line 5–line 11, p. 22, line 9–line 13, p. 41, line 27–line 28, p. 43, paragraph 1—pharagraph 2, p. 49, paragraph 4, p. 50, paragraph 5—p. 51, paragraph 1.

(Continued)

*Primary Examiner*—Xu Mei
(74) *Attorney, Agent, or Firm*—Aslan Baghdadi Shaw Pittman LLP

(57) ABSTRACT

A method and system for encoding digital information is disclosed. According to the method, media program information is captured and used to produce a media program file. An encoding request is received from a client which requests that the media program information be encoded in one or more encoding formats. A set of encoding engines are selected that can encode the media program information in each of the one or more encoding formats. The media program file is then sent to the selected set of encoding engines to encode the media program information in the one or more encoding formats.

8 Claims, 6 Drawing Sheets

OTHER PUBLICATIONS

"Encoding.com Launches Rich Media Advertising Service to Enable Use of Audio and Video Advertising on the Net" Online! Oct. 26, 1998, pp. 1–2, XP002141651 Retrieved from the Internet: <URL:encoding.com/company/news/releases/prl 10¯26_98.html> retrieved on Jul. 11, 2000! Page 1, paragraph 4 –p. 2, line paragraph 1.

Patent Abstracts of Japan vol. 13, No. 198 (E–756), May 11, 1989 & JP 01 019874 A (Matsushita Electric Works LTD), Jan. 23, 1989 abstract.

Akira, Y., "Image Encoding System", Patent Abstracts of Japan, vol. 013, No. 198, May 11, 1989 (JP 01 019874 A, dated Jan. 23, 1989).

"Encoding.com Launches Rich Media Advertising Service to Enable Use of Audio and Video Advertising on the Net", Online!, Oct. 26, 1998, 2 pages, printed from internet site "http://encoding.com/ company/news/releases/pr10_26_ 98.html".

* cited by examiner

DISTRIBUTED PRODUCTION SYSTEM FOR DIGITALLY ENCODING INFORMATION

This patent application claims priority from,

U.S. Provisional Patent Application No. 60/119,762, filed on Feb. 11, 1999, entitled PRODUCTION SYSTEM FOR DIGITALLY ENCODING INFORMATION;

U.S. Provisional Patent Application No. 60/120,209, filed on Feb. 11, 1999, entitled MEDIA DISTRIBUTION SYSTEM;

U.S. Provisional Patent Application No. 60/120,207, filed on Feb. 11, 1999, entitled SYSTEM FOR REMOTE PERFORMANCE OF DIGITAL ENCODING;

U.S. Provisional Patent Application No. 60/120,206, filed on Feb. 11, 1999, entitled DIGITAL VCR;

U.S. Provisional Patent Application No. 60/120,208, filed on Feb. 11, 1999, entitled SYSTEM FOR HANDLING VOICE MAIL IN AN E-MAIL SYSTEM; and U.S. Provisional Patent Application No. 60/156,817, filed on Sep. 29, 1999, entitled STREAMING MEDIA ENCODING AGENT FOR TEMPORAL MODIFICATIONS;

the content of which are hereby incorporated by reference in their entirety.

FIELD OF THE INVENTION

The present invention generally relates to computer systems, and more specifically to a distributed encoding mechanism for encoding digital information.

BACKGROUND OF THE INVENTION

In recent years, the media industry has expanded its horizons beyond traditional analog technologies. Recorded media programs such as audio, photographs, and even feature films are now being recorded or converted into a variety of different digital encoding formats. For example, digital movies may now be encoded using a variety of different encoding formats such as RealVideo, RealMedia, MPEG, QuickTime and WindowsMedia encoding formats. Likewise, digital audio recordings may be encoded using a variety of different encoding formats such as RealAudio, Liquid Audio and Windows Media encoding formats.

In general, the process of encoding a media program can take a significant amount of time. Often, the time required to encode a recorded media program may be significantly greater than the actual play time of the media program. For example, to encode a two-hour analog VHS tape in MPEG II format can often take four or more hours. Thus, although there is an abundance of different encoding formats for use, the fact that encoding is conventionally performed in a serial manner with each encoding process requiring a significant amount of time and resources to complete, a particular media program will typically be encoded in only a limited number of encoding formats.

For example, to encode the songs that are contained on a CD using the Liquid Audio format, a user is generally required to perform the following steps: (1) capturing the data from the CD into a file; (2) launching the corresponding encoder application; (3) entering the specific encoding parameters that are to used to encode the media program; (4) entering any metadata from the CD (i.e. title, author, etc.) that is to be included in the encoded file; (5) submitting the data file to the encoder; and (6) waiting for the encoding process to complete.

In general, the step of entering the specific encoding parameters for a particular encoding application can be an awkward and tedious task. Often, the encoder application interface provides a user with little or no information as to what affect an encoding parameter may have or how setting a parameter to a particular value will affect the quality of the encoded media program. Moreover, the user interface of each encoding application typically operate on one file at a time. As such, to encode a media program in multiple encoding formats, a user is generally required to create a batch command-line that will include a specific set of encoding parameters for each encoding format. However, the creation of these batch command-lines is both tedious and difficult; thus causing the command-lines to be prone to errors. Therefore, to reduce the need of generating batch command-lines, a user will typically repeat the encoding process several times in order to encode the media program with the appropriate encoding parameters.

In addition, if the user would like the songs to also be encoded using a different encoding format, the user is forced to repeat the steps of (1) launching the corresponding encoder application; (2) entering the specific encoding parameters that are to used to encode the media program; (3) entering any metadata from the CD (i.e. title, author, etc.) that is to be included in the encoded file; (4) submitting the data file to the encoder; and (5) waiting for the encoding process to complete.

Thus, for each encoding format, the user is required to enter the metadata for the media programs and to specify the specific encoding parameters that are to used to encode the media program. Moreover, the user must have access to the encoding applications that are of interest to them and specific knowledge as to the encoding parameter values that should be used to encode the media program for each encoding format.

Based on the foregoing, it is clearly desirable to provide a mechanism that can reduce the amount time and user intervention that is typically required to encode a media program in multiple media formats.

It is also desirable to reduce the amount of duplicate information that an individual is required to supply when encoding media program in multiple encoding formats.

It is further desirable to provide a mechanism that can reduce a users need to understand the significance of the different encoding parameters that are used by the different encoding applications.

SUMMARY OF THE INVENTION

The present invention comprises, in one aspect, a method for encoding digital information, including the steps of: capturing, from a source, media program information as a media program file; receiving an encoding request from a client that requests that the media program information be encoded in one or more encoding formats; selecting a set of encoding engines that can encode the media program information in each of the one or more encoding formats; and sending the media program information to the selected set of encoding engines to cause the selected set of encoding engines to encode the media program information in the one or more encoding formats.

The invention also encompasses a computer-readable medium, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A distributed encoding system for encoding media programs is disclosed. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

CONTEXT OVERVIEW

A set of information or content that may be encoded in a particular encoding format is generally referred to herein as a "media program". For example, the information contained on such storage mediums as VHS or 8-MM tapes, DVDs or Laser Discs, BetaCams or Digital Video Cassettes, Compact Discs (CDs), and audio cassettes or 8-Track tapes are all examples of media programs that can be encoded using the described distributed encoding system. Further, media programs may be received from sources other than pre-recorded storage. For example, a media program may arrive as a live feed from an analog or digital camera, or from a satellite or cable feed.

As described herein, a media program may consist of an entire work, such as the entire movie stored on a VHS tape; or may instead consist of only a portion of a work, such as a single song stored on a CD that contains a plurality of recorded songs.

In addition, the term "program metadata" refers to the information that is associated with a particular media program but which is not actually part of the information that is typically heard or seen when viewing or listening to the media program. Program metadata may consist of information that is of written form, such as printed information on a CD jacket, or electronically encoded information, such as serial numbers and track information that is typically coded within the CD itself. For example, the artist name, song titles and copyright information associated with a CD represents program metadata that is not typically heard when playing the CD.

DISTRIBUTED ENCODING SYSTEM

According to one aspect of the invention, a distributed encoding system is provided that allows parallel encoding of media programs. In one embodiment, a capturing unit is configured for capturing or "ripping" a variety of different media programs. The capturing unit can capture media programs that are stored using a variety of different formats and which reside on a variety of different storage mediums, or which are not pre-recorded on any storage medium. For example, the capturing unit can capture media programs that are stored on storage mediums that include but are not limited to, CDs, DVDs, VHS tapes, LaserDisc, Audio Cassette, etc. To capture a media program, the information is read from its source and then stored as a "captured file". In one embodiment, the capturing unit may be configured to capture a plurality of media programs in parallel. Once captured, the captured file is stored within an accessible storage unit. In certain embodiments, a unique "Master_ID" is generated and associated with each captured file. As will be explained in detail below, the unique Master_ID is used to correlate with each captured file the set of program metadata that is associated with each captured file.

In one embodiment, the distributed encoding system causes an interface to be displayed at a client that is connected to the distributed encoding system. By interacting with the interface, a user may enter program metadata, such as title, author, and copyright information that is associated with the particular media program. The program metadata is stored within an accessible storage unit. In one embodiment, the distributed encoding system uses the unique Master_IDs to associate the program metadata information with the corresponding captured file.

In addition, through the interface, the user can create "encoding orders" by selecting one or more encoding formats for encoding the media program. After an encoding order is created, it is stored into an accessible storage unit and scheduled for processing.

A distribution unit is configured to identify encoding orders that need to be processed. When an encoding order is identified, the distribution unit retrieves the captured file and its corresponding program metadata from the accessible storage unit. The distribution unit then selects one or more available encoding units that may be used to encode the captured file and corresponding program metadata information. The distribution unit then sends the information to the selected encoding units.

Upon receiving the captured file and program metadata information, the encoding units interface with one or more encoding engines (based on the selected encoding formats) to encode the media program information and corresponding metadata information into an "encoded program". Once encoded, the encoded programs are stored into the accessible storage unit via the distribution unit. The encoded programs may then be delivered to the specified customer using a variety of different delivery mechanisms.

Figure 1:
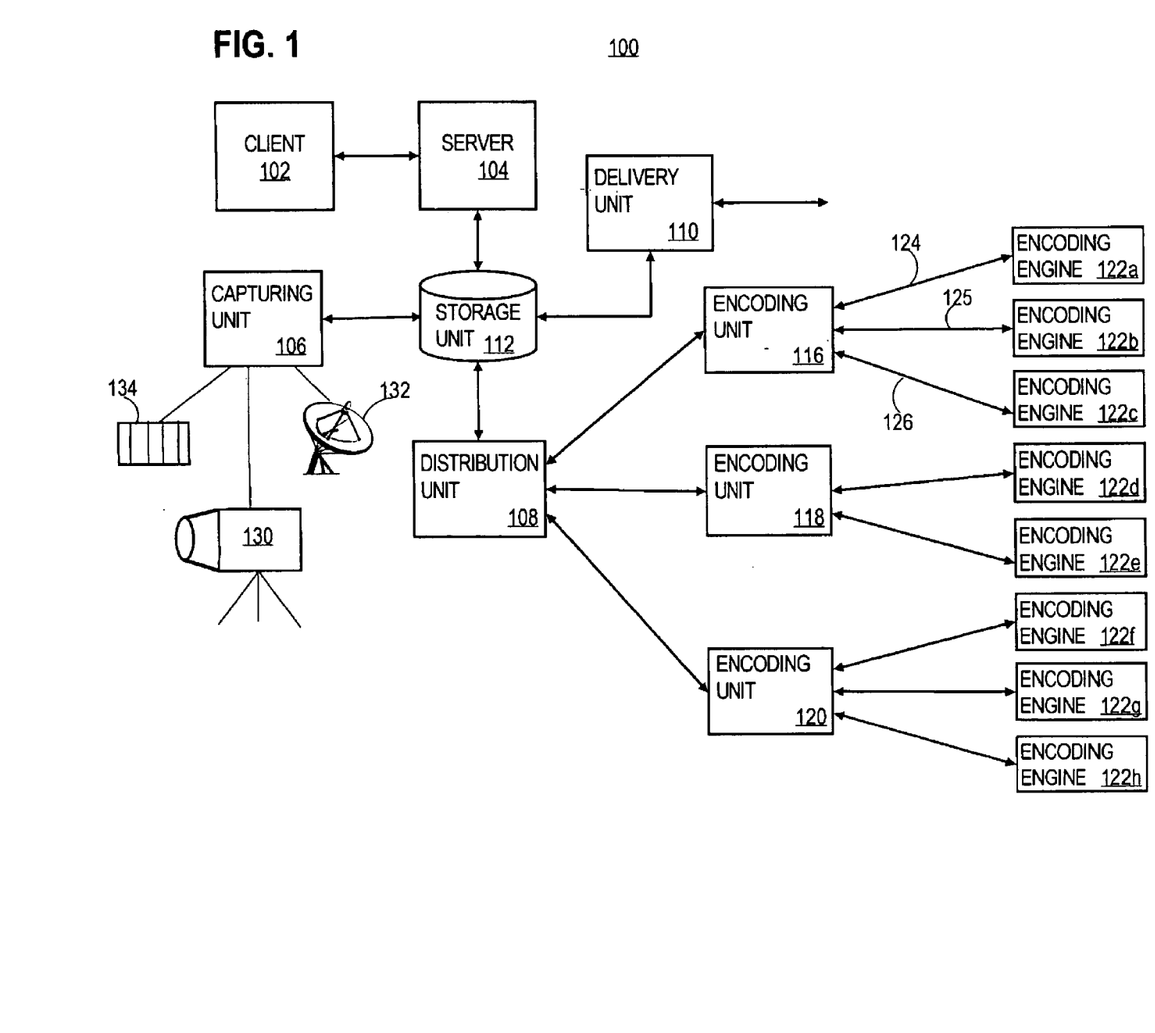
FIG. 1 is a block diagram of a computer system architecture in which the present invention may be utilized.

FIG. 1 is a block diagram of an encoding system 100 in which certain embodiments of the invention may be used. Generally, encoding system 100 includes a client 102, a server 104, a capturing unit 106, a distribution unit 108, a delivery unit 110, a storage unit 112, one or more encoding units 116, 118, 120, and a plurality of encoding engines 122a-h. As is depicted in FIG. 1, the components of system 100 are connected through one or more network systems. These one or more network systems may include, but are not limited to, Local Area Networks (LAN), and Wide Area Networks (WAN), including the Internet. Thus, the encoding system allows each component to be separately located.

THE CAPTURING UNIT

Capturing unit 106 is a combination of hardware and/or software components that are configured for capturing or "ripping" a variety of different types of media programs that may be stored on a variety of different storage mediums. For example, capturing unit 106 may be used to capture media programs that consist of audio data, video data, or combinations of both audio and video data. These media programs may be captured from a variety of different sources including live feeds and storage mediums such as CDs, video tapes, audio tapes, laser discs, floppy disks, along with any other form of storage medium that can be used to store media programs. For example, as depicted in FIG. 1, capturing unit 106 may receive media program information from a variety of sources, that includes but is not limited to a digital or analog camera 130, asatellite system 132, or a CD and/or DVD player 134. As such, embodiments of the invention are not limited to any particular source, nor any particular form or type of media program, nor is it limited to any particular form or type of storage medium that is used to store the media programs.

The capturing unit 106 may be configured as either an automatic ripping mechanism or as a manual ripping unit. In one embodiment, the capturing unit 106 is configured to capture or rip a plurality of media programs in parallel. For example, capturing unit 106 may consist of a large number of CD readers that allow the media programs from hundreds of CDs to be captured in parallel.

In another embodiment, the capturing unit 106 may be configured to allow the capturing of all or separate segments of a media program. For example, the capturing unit 106 may include a video editing mechanism that allows a user to control which portions of the video are captured for encoding.

To capture a media program, the capturing unit 106 reads the information from its source and stores it as a "captured file" within storage unit 112. If a particular storage medium source contains analog data, the capturing unit 106 digitizes the data and then stores it as a captured file. For example, in capturing a media program that is stored on an analog VHS tape, capturing unit 106 performs an Analog-to-Digital (A/D) conversion to capture the information into a captured file. Alternatively, if a media program is already in digital format, such as audio that resides on a CD, then the capturing unit 106 may create a .WAV file without having to perform an A/D conversion.

MASTER_ID ASSIGNMENT

Upon its creation, each captured file is assigned a unique Master_ID that uniquely identifies the captured information from all other captured file information. In certain embodiments, the capturing unit 106 uses a hash function to generate the unique Master_IDs. In one embodiment, the hash function is used to generate the unique Master_ID for each captured file based on the specific contents of each captured file. Both the Master_ID and captured file information are stored within storage unit 112.

In certain embodiments, a physical representation of the Master_IDs is also attached to the physical storage medium from which the captured file is generated. For example, a bar code may be generated for each Master_ID, printed on a sticker, and attached to the storage medium from which the captured file is generated (or the physical container thereof). As is discussed in detail below, the Master_IDs are later read and used to correlate the captured file with its program metadata.

ENCODING REQUESTS AND ENCODING ORDERS

Client 102 represents a device, such as a personal computer, workstation, or other like device that is capable of communicating with server 104. In one embodiment, client 102 includes a browser application, such as Microsoft Internet Explorer® or Netscape Navigator®, that can request, receive and display electronic documents over a network connect.

Server 104 is a computer, or one or more hardware or software components or processes that cooperate or execute in one or more computer systems. For example, server 104 may be configured as a Java Servlet running on an Apache web server on Linux.

Server 104 is configured to respond to message requests that are received from clients, such as client 102. In one embodiment, server 104 communicates interface data to client 102 for displaying a user interface at client 102. The interface data may consist of electronic document information, such as HyperText Markup Language (HTML) or Extensible Markup Language (XML) page information that is communicated between server 104 and client 102. In one embodiment, the user interface data consists of interface templates that provide a user-friendly mechanism for entering customer requests ("encoding requests"). Each encoding request generally includes a set of customer order information, program metadata information and a set of encoding parameters for a particular captured file. Thus, by interacting with the user interface provided by server 104, a user can readily create encoding requests for the encoding captured media programs.

In one embodiment, each encoding request includes a Master_ID that identifies the captured file that corresponds to the particular request. For each request, the Master_ID may be manually entered by the user or read by a reader that is coupled to client 102. For example, client 102 may include a bar code reader that is configured to read the Master_ID information that was previously attached to the storage medium or storage medium container that is associated with the captured file.

Table I illustrates an example of the type of information that may generally be included within an encoding request.

TABLE 1

| | |
|---|---|
| CUSTOMER ORDER INFORMATION | Customer name, address, phone number, email address; Delivery options (i.e., email encoded data and/or provide the encoded data on a particular type of storage medium). |
| PROGRAM METADATA INFORMATION | Master_ID; Author names; Titles; Copyright information; |
| ENCODING PARAMETERS/SETTINGS | Encoding format, Target Bitrate, Audio format, Video format |

Upon receiving an encoding request, encoding system 100 generates an order ("encoding order") and assigns it a unique Job_ID that uniquely identifies the particular order within the distributed encoding system. In one embodiment, the distributed encoding system automatically generates a unique Job_ID in response to the opening of a new encoding order. In addition to a unique Job_ID, each encoding order is assigned the Master_ID that identifies the corresponding captured file that is associated with the particular encoding order. Thus, when an order is generated, the Master_ID that was generated for the captured file that has the content identified in the order is assigned to the order.

Once an encoding order is generated, server 104 stores the encoding order information (which includes the unique Job_ID and Master_ID) within storage unit 112. Although depicted as a single component, storage unit 112 may include one or more storage devices that may be connected locally or distributed remotely across one or more networks. Storage unit 112 maintains the captured file and encoding order information. In one embodiment, at least a portion of storage unit 112 is configured as a database system which maintains a set of tables (schema) for tracking and coordinating the completion of the encoding orders.

DISTRIBUTION UNIT

Distribution unit 108 is a computer, or one or more hardware or software components or processes that is configured to identify encoding orders that need to be processed ("pending job orders") and to distribute each pending job order to one or more available encoding units (116, 118, 120). In one embodiment, the distribution unit 108 receives an interrupt when a pending job order is present within storage unit 112. In another embodiment, distribution unit 108 is configured to periodically poll storage unit 112 to identify any pending job order.

As previously indicated, a pending job order may require the captured file and program metadata to be encoded in multiple encoding formats ("encoding threads"). To that end, distribution unit 108 maintains a record as to which encoding units are currently available and which encoding engines are associated with each encoding unit. The distribution unit 108 maintains state information to keep track of which encoding units are currently available to process the encoding threads. Table 2 illustrates an example of how state information may be maintained by distribution unit 108 to keep track of which encoding units are currently available to process the encoding threads.

TABLE 2

| ENCODING UNIT | ENCODING ENGINE | TYPE | AVAILABLE |
|---|---|---|---|
| 116 | 122a | Real Media | Yes |
| 116 | 122b | Liquid Audio | Yes |
| 116 | 122c | Windows Media | No |
| 118 | 122d | Real Video | Yes |
| 118 | 122e | Real Media | No |
| 120 | 122f | Liquid Audio | Yes |
| 120 | 122g | Windows Media | Yes |
| 120 | 122h | Quick Time 3.0 | No |
| . | . | . | . |
| . | . | . | . |
| . | . | . | . |

By inspecting this information, distribution unit 108 can identify which encoding units (116, 118, 120) are both available and capable of completing one or more encoding threads required by a job. In addition, distribution unit 108 can perform load balancing on the encoding units (116, 118, 120) to achieve optimal performance from a plurality of different encoders. Upon selecting a set of one or more encoding units, the Distribution unit 108 forwards the encoding thread requests to each of the selected encoding units.

THE ENCODING UNITS

Encoding units 116, 118 and 120 represent computers, or one or more hardware or software components or processes that are configured to initiate the encoding of an encoding thread request. In particular, encoding units 116, 118 and 120 are configured to receive encoding requests from distribution unit 108. Upon receiving an encoding request, encoding units 116, 118 and 120 respectively interface with encoding engines 122a-c, 122d-e and 122f-h to fulfill the pending job order.

Encoding engines 122a-h represent a variety of different types of encoders that are capable of encoding data in a particular encoding format. For example, encoding engines 122a-h may be, but is not limited to, a combination of Real, Windows Media, Liquid Audio, MPEG, A2B, Audiobase, MP3, Blade, Xing or QuickTime encoders. Encoding engines 122a–h may be either "off-the-self" encoders or proprietary encoders. Thus, embodiments of the invention are not limited to any particular type of encoder.

In one embodiment, encoding units 116, 118 and 120 are configured to communicate with the different Application Program Interfaces (APIs) of encoding engines 122a-h. A variety of techniques may be used to communication between the encoding units 116, 118, 120 and each of the encoding engines 122a-h. Encoding units 116, 118 and 120 and encoding engines 122a-h may be statically or dynamically linked and may communicate through a variety of different communication mechanisms that may include the use of application APIs such as DLL/COM calls or command line APIs or any other communication mechanism that allows information to be conveyed between multiple software units or applications. For example, encoding units 116, 118 and 120 may communicate with encoding engines 122a–h through a set of Dynamic Link Libraries (DLLs) that are supplied by encoding engines 122a–h or through command line execution of encoding engines 122a–h. In one embodiment, the Java Media Framework (JMF) API provides the communication mechanism between the encoding units 116, 118, 120 and the encoding engines 122a–h. The JMF API provides a simple unified architecture for synchronizing and controlling time-based data, such as audio and video data within Java applications and applets. Table 3 illustrates an example of several of the playing and encoding formats that are supported by the JMF API.

TABLE 3

| AUDIO | AIFF, AU, DVI, G.723, GSM, IMA4, MIDI, MPEG-1 LAYER 1/2, PCM, RMF, WAV |
|---|---|
| VIDEO | APPLE GRAPHICS (SMC), APPLE ANIMATION (RLE) CINEPAK, H.261, H.263, INDEO 3.2, MOTION-JPEG, MPEG-1, UNCOMPRESSED |
| FILE FORMATS | AVI, QUICKTIME, VIVO |
| PROTOCOLS | FILE, FTP, HTTP, RTP (RFC 1889/1890) |

The portion of the encoding task that is performed by an individual encoding engine (122a-h) is referred to herein as an "encoding thread". In general, for each format that a particular program media is to be encoded, an encoding thread is executed. Specifically, for each such thread, an encoding unit communicates with an encoding engine that is configured to encode the program media in the specific format. For example, FIG. 1 illustrates a set of encoding threads 124, 125 and 126 respectively between encoding unit 116 and encoding engines 122a, 122b and 122c. Encoding system 100 may be configured to cause the encoding threads to be performed serially or in parallel.

During execution of an encoding thread, the encoding engines generate data that is encoded in the required format. Upon completing an encoding thread, the encoding engines (122a–h) communicate the data back to the encoding units 116–120 which then return the encoded data back to distribution unit 108. Distribution unit 108 then stores the encoded data ("encoded data files") onto storage unit 112.

THE DELIVERY UNIT

Delivery unit 110 provides a mechanism for delivering completed encoding orders to the proper customers. A variety of methods may be used to deliver the completed encoding orders to their proper customers. For example, the encoded information can be emailed to the customer or provided on a storage medium, such as a DVD, CD-ROM, floppy disk, Zip drive tape, a Digital Audio Tape (DAT), or other type storage medium that is capable of storing the encoded information. The information may also be FTP'd to the proper customers over a network system, such as the Internet or other available network system.

In one embodiment, the Delivery unit 110 is a service for the network that is configured as an automated media and meta-data fulfillment process. By tightly integrating Delivery unit 110 with the rest of the servers in the production system, the Delivery unit 110 extends the capabilities of each service node on the network to access resources needed to publish files, and information about those files, to external servers in an automated fashion. In addition, by defining an Object Delivery Protocol (ODP), the network will allow Delivery Units being used by the Delivery Agents to communicate together, seamlessly moving files and meta-data from service to service with the required knowledge to perform the correct functions. For example, using this model, it is possible to deliver a file and its associated meta-data to an external ODP compliant Web Server where the receiving service uses the ODP attributes to determine the appropriate procedure. By embedding or wrapping ODP attributes around a file, the attributes can be used to command absolute paths, permission/authorization, HTML link generation, database updating, event triggering, and the like. In this way the knowledge to access servers, services, near-line back up systems, and RAID spaces resides in the ODP object and not in a delivery mechanism. This abstraction makes it possible to easily expand to other delivery processes. For example, an FTP Agent can access the ODP "user_name", "password", and "file_path" attributes to publish a file to a FTP server that doesn't have the benefit of an ODP service.

In one embodiment, the ODP Server is configured as the external system that knows how to accept and deal with the ODP objects the client sends it. Beyond the obvious 'fail-safe' mechanism in standard transfer applications, this server has the capability to use the embedded class name string in the ODP object to dynamically load an object to handle the actions to be performed on files and meta-data that was received. These class-loaded objects can be on the local machine, or downloaded from a public code base server if needed. With the described mechanism, the possibilities of upgrading internal and external, even customer, servers is quite simple and straightforward.

ENCODING MEDIA PROGRAMS

Figure 3:
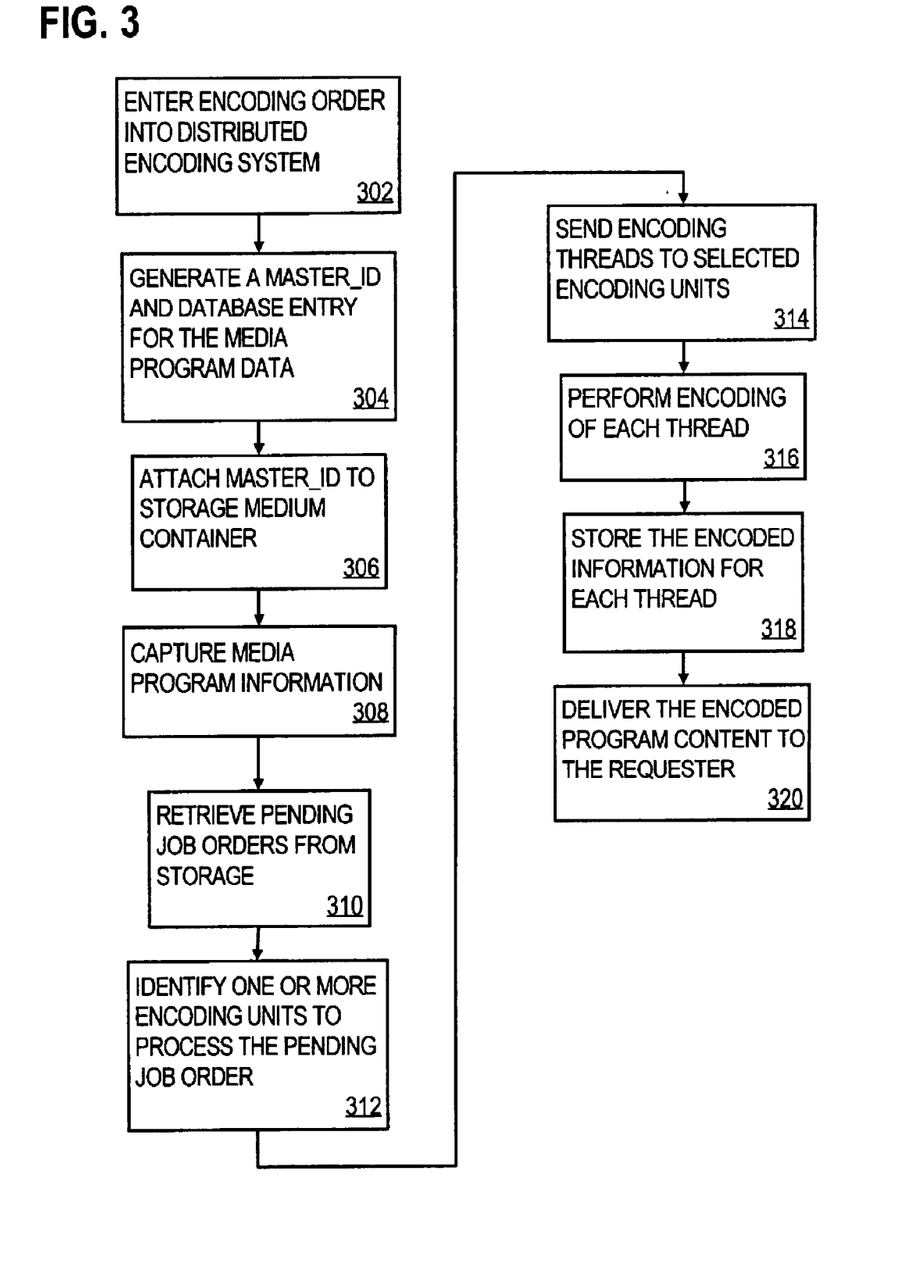
FIG. 3 is a flow diagram that illustrates a method for encoding a media program.

FIG. 3 is a flow diagram that illustrates a method for encoding a media program. For explanation purposes, the steps of FIG. 3 are described with reference to the components of FIG. 1. Also for explanation purposes, it shall be assumed that the media program consists of a group of songs contained on a CD, that the media program is to be encoded in RealMedia, Liquid Audio, and Windows Media formats, and that encoding engines 122a and 122e are RealMedia encoders, encoding engines 122b and 122f are Liquid Audio encoders, and encoding engines 122c and 122g are Windows Media encoders.

At step 302, an encoding order is entered into the distributed encoding system as a pending encoding order. For example, by interacting with client 102, a user can enter customer order information, program metadata and a set of encoding parameters for a particular media program. The media program is then assigned to the encoding order for processing. As previously indicated, for explanation purposes only, it is assumed that the set of encoding parameters indicates that the captured file is to be encoded using the RealMedia, Liquid Audio, and Windows Media formats.

At step 304, a Master_ID is generated to assign to the captured file (i.e. to the .WAV file).

At step 306, a physical indication of the Master_ID is produced, and attached to the storage medium container of the media program. For example, a bar code sticker may be created having the Master_ID value and attached to the CD's jewel box.

At step 308, capturing unit 106 is used to capture the media program information (captured program) from its storage medium. For example, by placing the CD within a CD reader and reading data from the CD, a .WAV file may be created based on the media program information. The Master_ID is then associated with the captured program and stored as an entry within a database system.

At step 310, the pending job order is retrieved from storage. For example, distribution unit 108 determines that a pending job order exists and retrieves the pending job order information from storage unit 112.

At step 312, one or more encoding units are identified to process the pending job order. For example, using the information previously depicted in Table 2, distribution unit 108 determines that encoding unit 116 includes encoding engines 122a and 122b that are available for processing encoding threads in Real Media and Liquid Audio formats, respectively, and that encoding unit 120 includes encoding engines 122f and 122g that are available for processing encoding threads in Liquid Audio and Windows Media formats, respectively. In this example it shall be assumed that distribution unit 108 selects encoding unit 116 to process the encoding threads for the Real Media and Liquid Audio formats and encoding unit 120 to process the encoding thread for the and Windows Media format. The actual encoding units that are selected to process a particular order will vary from order to order based on the encoding requirements of the order, the current load on the encoding units, and the load balancing technique employed by the distribution unit 108.

At step 314, distribution unit 108 sends the encoding thread information to one or more selected encoding units. For example, distribution unit 108 sends the encoding thread information for the Real Media and Liquid Audio formats to encoding unit 116 and the encoding thread information for Windows Media format to encoding unit 120.

At step 316, the selected encoding units communicate with the appropriate encoding engines to encode the information required by each encoding thread. For example, encoding unit 116 communicates with encoding engine 122a to process the Real Media encoding thread, and with encoding engine 122b to process the Liquid Audio encoding thread. Similarly, encoding unit 120 communicates with encoding engine 122g to process the Windows Media encoding thread.

At step 318, upon completing each thread, the encoded data files are returned to distribution unit 108. Distribution unit 108 then stores the encoded information into storage unit 112.

At step 320, the encoded information is delivered to the proper customer. For example, delivery unit 110 may be configured to automatically retrieve the encoded information and to FTP the information to an address that was previously associated with the encoding order. Alternatively, delivery unit 110 may be configured to automatically retrieve the encoded information and to cause a CD-ROM to be burned or programmed with the retrieved information. The CD-ROM can then be sent to the address previously entered with the encoding order.

LOAD BALANCING

As previously indicated, the distributed encoding system performs automatic load balancing to achieve increased encoding performance. In one embodiment, the automatic load balancing is achieved using such factors as the location of the machines (units) that are available to participate in the encoding process, the capacity or throughput of the different units and the number of encoding jobs that are queued for execution at any particular unit. The distributed encoding system can automatically start and stop selected units to achieve enhanced distribution and increased encoding performance. In addition, by knowing what encoding units are available, the distributed encoding system can encode in parallel multiple files in multiple formats.

In one embodiment, the distributed encoding system is configured as an object oriented system in which objects are passed from one component to another. For example, in certain embodiments, captured files, program metadata, encoding orders, pending job orders and encoding threads are represented as objects that are passed between the different components of the distributed encoding system.

DETERMINING APPROPRIATE ENCODING SETTINGS

As previously indicated, a significant drawback with encoding a particular media program using multiple encoders is that each type of encoder typically requires a different set of encoding parameters to be set. For example, to properly encode a media program on a specific type of encoder, a user may be required to supply (1) the number of frames per minutes that are to be viewed; (2) the speed of the modems that viewers will be using to play the encoded program, (3) whether the program should be encoded in stereo; (4) the audio or video codec.

In one embodiment, the encoding system provides a common interface to the user independent of which encoders are to be used for encoding a particular media program. In certain embodiments, the encoding system is configured as a knowledge-based encoding system ("knowledge database") that provides helpful hints to aid users in selecting the best encoding settings for their particular environment. In one embodiment, the knowledge database provides users with a common parameter interface for generating and submitting encoding requests. The common parameter interface reduces the complexity of the user interface and limits the specific encoding knowledge that a user is typically required to hold in order to properly submit an encoding request. In addition, through the user interface a user can provide a single set of encoding parameters, for one or more media programs, that is used across a plurality of different encoding engines to produce multiple encoded files.

Figure 6:
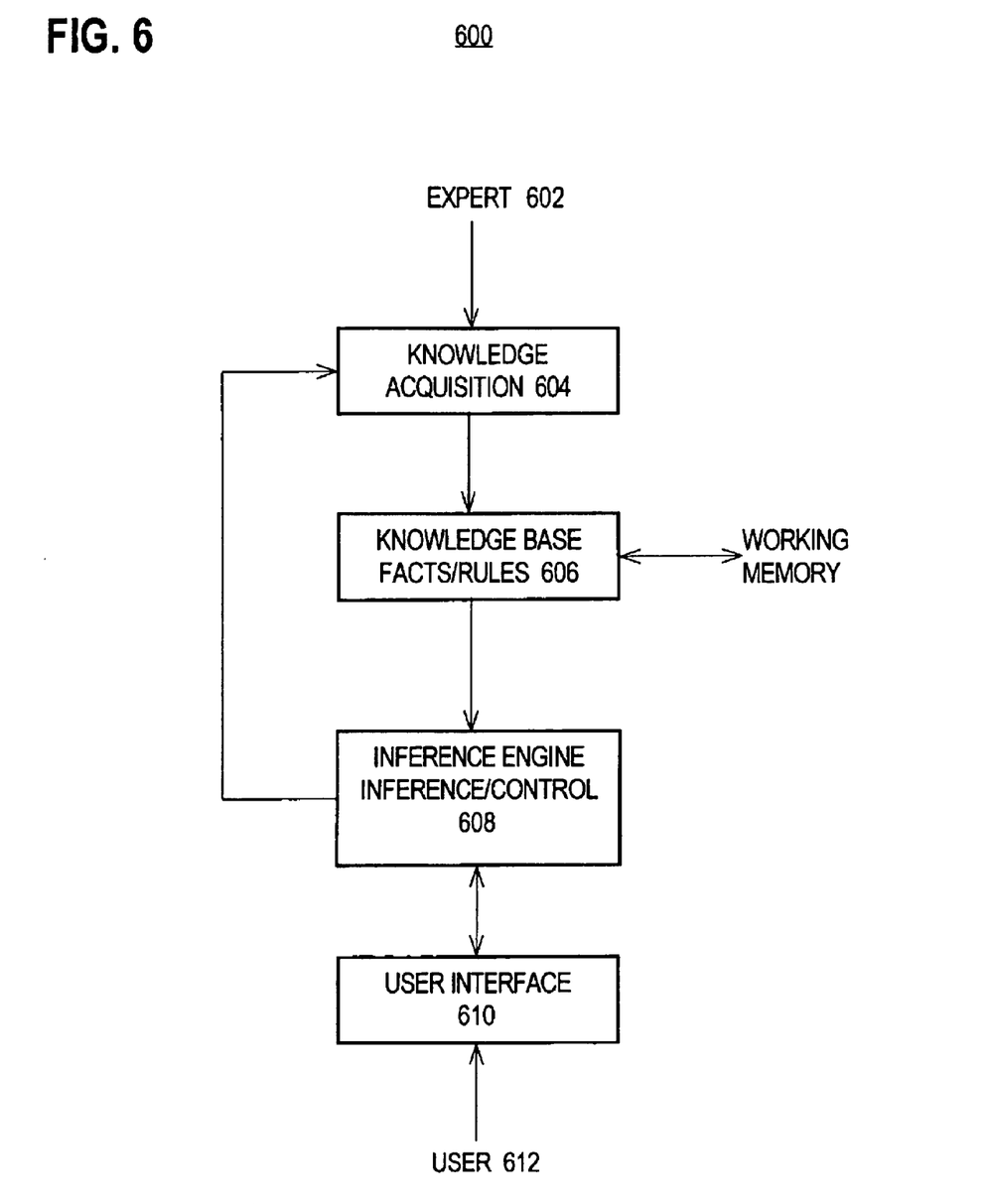
FIG. 6 illustrates an example of an expert system upon which embodiments of the invention may be implemented.

FIG. 6 illustrates an example of a production expert system 600 in which certain embodiments of the invention may be used. As depicted, the production expert system 600 includes a knowledge acquisition component 604, a knowledge base component 606, an inference engine component 608, and a user interface component 610.

The knowledge acquisition component 604 is configured to gather encoding information about the different encoding engines. In one embodiment, the knowledge acquisition component 604 provides a user interface whereby encoding experts are able to enter rules based on their encoding expertise into the expert system. The knowledge acquisition component consists of syntax and a graphical tool (e.g., the Rule Editor) that simplifies the creation of new rules by checking rules against the required syntax. The rules themselves are expressions of facts that describe the expert's knowledge in a standard syntax. The rules that are created via the knowledge acquisition component are collectively known as the knowledge base component 606.

The knowledge base component 606 of production expert system 606 is the collection of rules defined by experts via the knowledge acquisition component 604. Within the expert system there is a knowledge base specific to each of the different encoding technologies that we support (Windows Media, Real Networks, Liquid Audio, etc.).

The inference engine component 608 of production expert system 600 is the unit that evaluates the current selection of the user interface component 610 against the Knowledge base component 606 in order to determine which rules to fire, which in turn determines the next user interface that the user interface component 610 will display. In one embodiment, the inference engine component 608 is configured to use the Java expert system shell ("Jess"). Further information as to the use of Jess can be obtained at the following web site: (http://herzberg.ca.sandia.gov/jess/).

The user interface component 610 of production system 600 is the component used by non-experts to define a set of encoding specifications that are then applied to a set of to-be-encoded files. In one embodiment, user component 610 is implemented as an HTML parser. The parser parses the rules specified in the knowledge base component 606 and displays them in an HTML form. The user 612 then selects options from this form. The user-selected options are then matched against the knowledge base component 606 via the inference engine component 608, and the user 612 is presented with a new set of options from which to choose. The final result of a session with the user interface component 610 is an Engineering Worksheet that specifies all of the specific settings to be applied to the encoding software when encoding the files.

Figure 2:
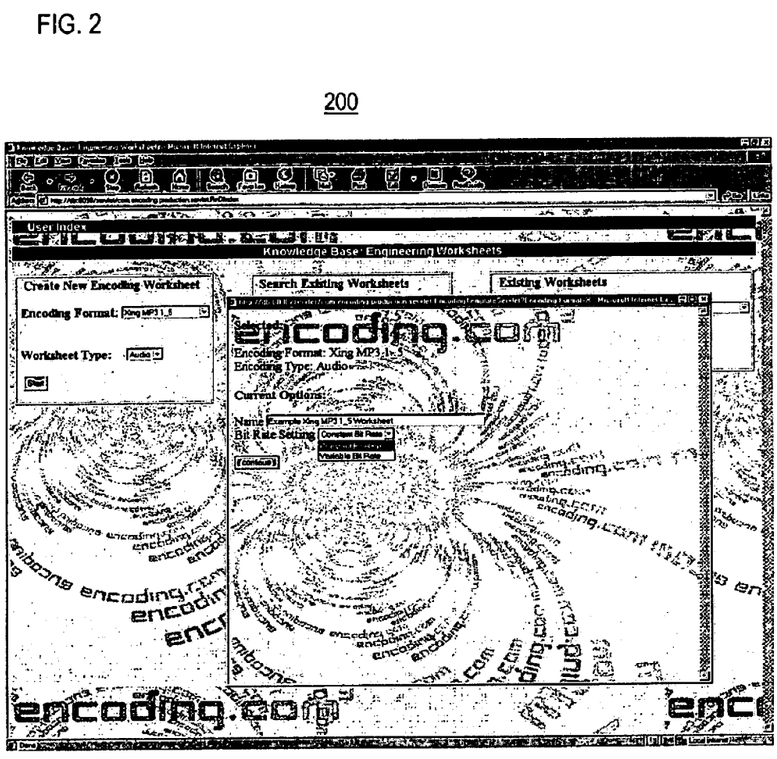
FIG. 2 illustrates an example of a user interface window that may be used to define a set of encoding specifications for encoding a particular file.

For example, FIG. 2 illustrates a user interface window 200 that may be used to define a set of encoding specifications that are then applied to a set of to-be-encoded files. In this example, a non-expert user has chosen to create Xing MP3 Audio encoding specifications. The expert system 600 evaluates this selection and determines that the next step is for the user to choose between a constant and a variable bit rate, as shown in the sub-frame. Once the user has made this selection and chooses continue, an additional HTML page will appear, and all of the options displayed on that page will be based on the fact that the user selected a constant bit rate. In this way the expert system guides the user through the creation of encoding specifications, minimizing or altogether eliminating specification mistakes.

PLUG AND PLAY COMPONENTS

According to one embodiment of the invention, capturing unit 106 and encoding units 116, 118, 120 are configured as plug-and-play components. As such, whenever a capturing unit or encoding unit is "plugged" into the encoding system, it announces its presence, for example by registering with a centralized database, thus making itself available to the other network devices and the other network devices available to it. For example, by using the Java-based technology "JINI"

that is available from Sun Microsystems, the distributed encoding mechanism provides a system that can be easily expanded and further distributed across multiple network systems. For example, in one embodiment, the use of JINI as an underlying technology supporting the production system allows the production system to take advantage of the service-plug-and-work capabilities of JINI. As such, JINI provides an infrastructure that allows services to be dynamically added and removed from the network, which improves the scalability of the production system. In certain embodiments, utilities are built on top of JINI to provide a flexible and easy way to create and administer new services. For example, two or more networks can be joined by extending a proprietary JINI base class. In one embodiment, the base class provides JINI service registration, join-manager services, lease renewal services, notification in the event that a service goes down, and service status/admin via a default admin user interface and a JINI service browser. The JINI service browser may be used to display all available services, and provides the user with the ability to interact with each service's administration user interface.

Further details as to the use of the JINI technology is available online at a variety of different Web sites, such as http://www.sun.com/jini/.

In certain embodiments, the capturing units and the encoding units are universal components that may be dynamically configured to perform either the capturing or the encoding functions. Thus, if the distributed encoding mechanism determines that additional capturing resources are needed, one or more encoding units can be dynamically configured to perform the functions of a capturing unit. Similarly, if the distributed encoding mechanism determines that additional encoding resources are needed, one or more capturing units can be dynamically configured to perform the functions of an encoding unit.

HARDWARE OVERVIEW

Figure 4:
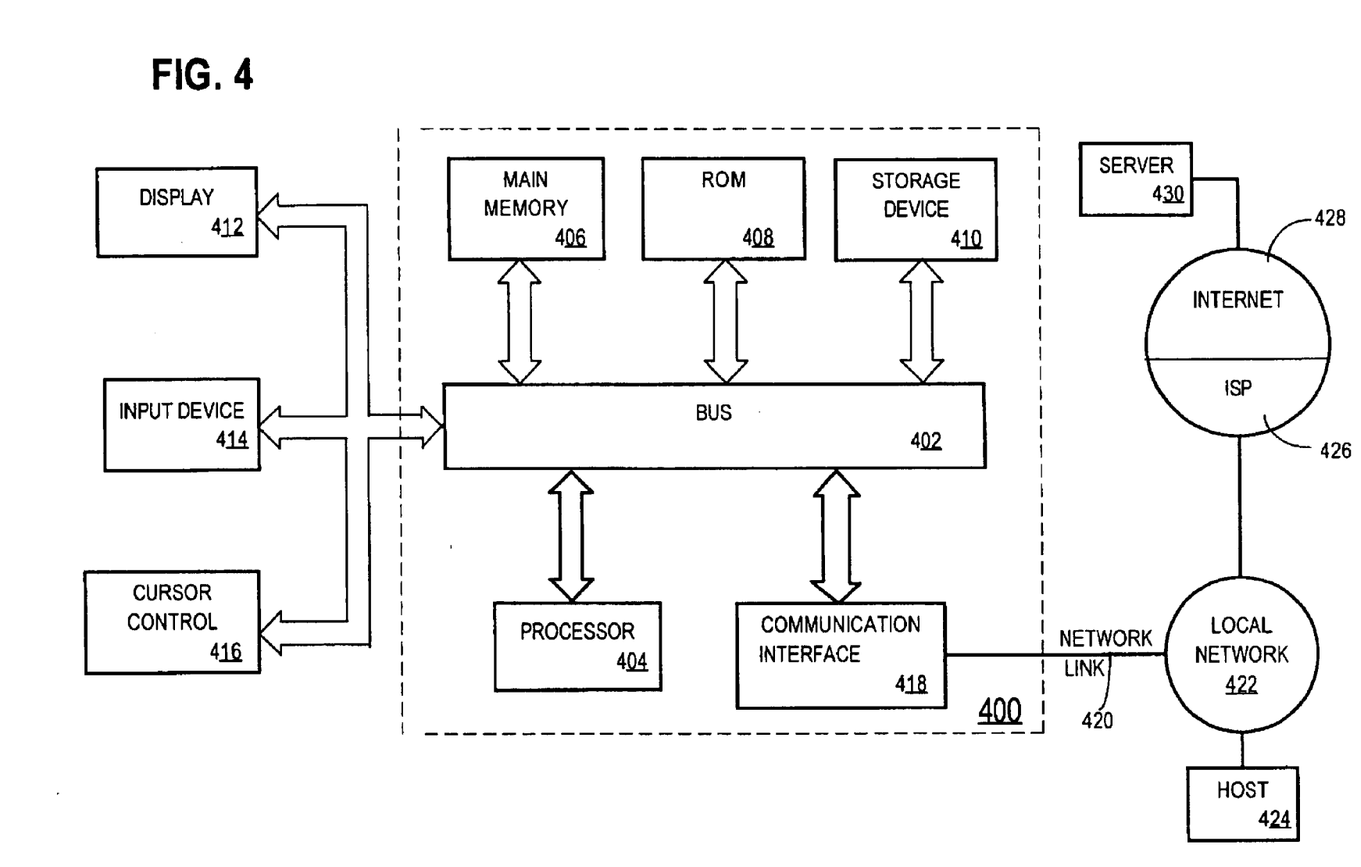
FIG. 4 is a block diagram of a computer system hardware arrangement that can be used to implement aspects of the invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for encoding media programs in a distributed encoding system. According to one embodiment of the invention, distributed encoding of media programs is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for distributed encoding of media programs as described herein.

The received code may be executed by processor 404 as it is received, and/or stored in storage device 410, or other non-volatile storage for later execution. In this manner, computer system 400 may obtain application code in the form of a carrier wave.

ALTERNATIVES, EXTENSIONS

The distributed encoding mechanism that is described herein provides an automated system for encoding a media program in a variety of different encoding formats. As explained, the distributed encoding mechanism maintains a "mapping" scheme between a captured file and its corresponding program metadata. In one embodiment, the mapping scheme allows the distributed encoding mechanism to encode a media program in multiple encoding formats in parallel. By encoding a media program in multiple encoding formats in parallel, the distributed encoding mechanism is able to significantly reduce the overhead that is typically required for encoding media programs in multiple encoding formats.

Figure 5:
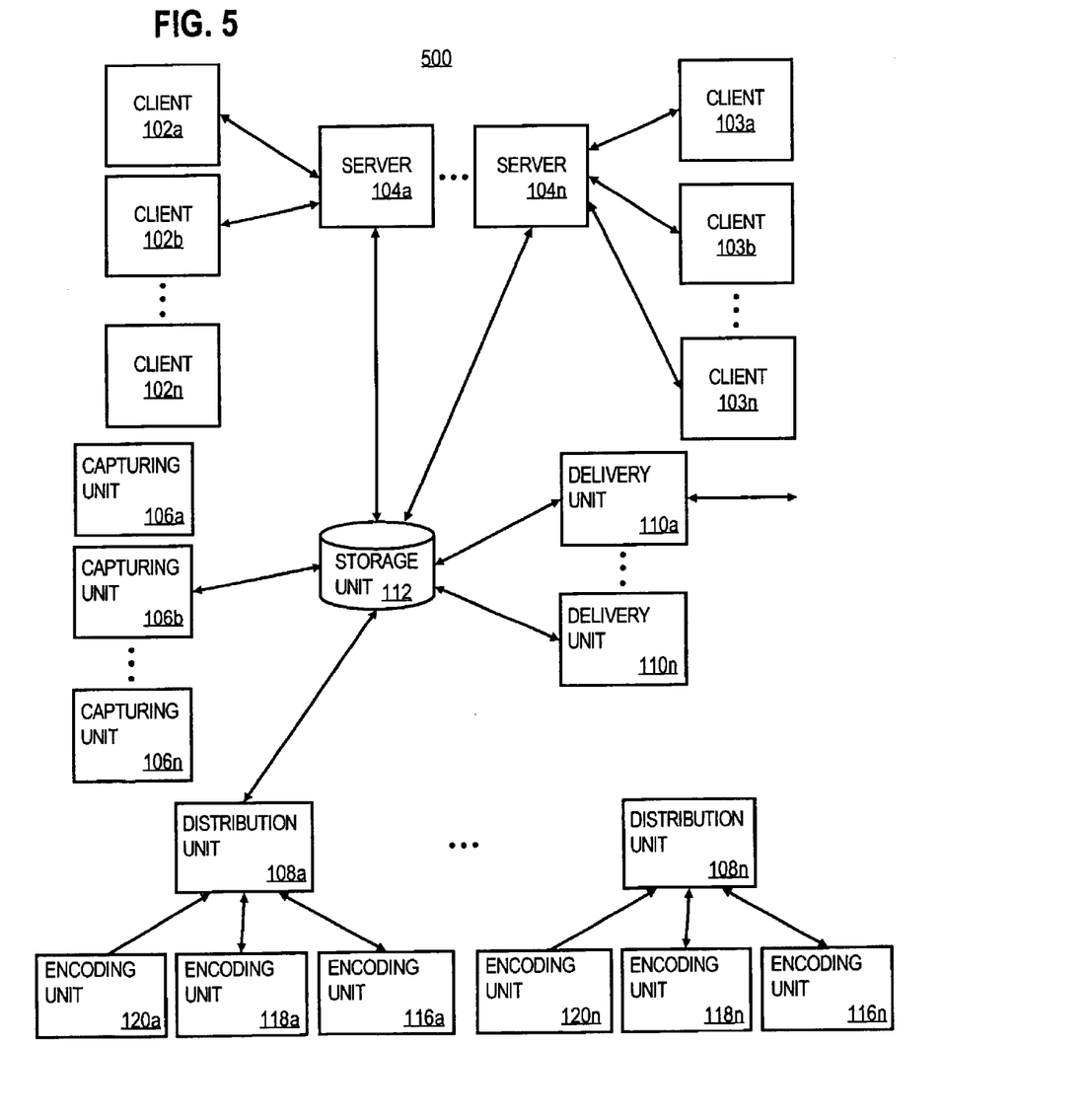
FIG. 5 is a block diagram of another computer system architecture upon which embodiments of the invention may be implemented.

In describing certain embodiments of the invention, several drawing figures have been used for explanation purposes. However, the invention is not limited to any particular context as shown in drawing figures. For example, for explanation purposes only, the encoding system 100 depicted in FIG. 1 includes only a single client 102, server 104, capturing unit 106, distribution unit 108, storage unit 112 and delivery unit 110. However, as illustrated in FIG. 5, embodiments of the invention are not limited to any particular number of any particular component, unit or device. By configuring the distributed encoding mechanism to include multiple components of each type, a fault tolerant system is created and additional parallelization is obtained throughout the system. Thus, the specification and drawings are, accordingly, to be regarded in an illustrative rather than a restrictive sense.

In addition, in this disclosure, including in the claims, certain process steps are set forth in a particular order, and alphabetic and alphanumeric labels are used to identify certain steps. For example, although the steps of entering an encoding order, generating a Master_ID, attaching the Master_ID to the storage container and capturing the media program information have been described as being performed in a particular order (FIG. 3), embodiments of the invention are, generally not limited to any particular order of events. Therefore, unless specifically stated in the disclosure, embodiments of the invention are not limited to any particular order of carrying out such steps. In particular, the labels are used merely for convenient identification of steps, and are not intended to imply, specify or require a particular order of carrying out such steps. Thus, embodiments of the invention are only limited by the following claims.

What is claimed is:

1. A method for encoding digital information, comprising the computer-implemented steps of:

capturing media program information to produce a media program file:

receiving an encoding request from a client, wherein the encoding request requests that the media program information be encoded in one or more encoding formats:

selecting a set of encoding engines that can encode the media program information in each of the one or more encoding formats;

sending the media program file to the selected set of encoding engines; and using said selected set of encoding engines to encode said media program information in said one or more encoding formats:

identifying an encoding order as a pending job order that needs to be processed;

identifying one or more encoding units that are available to process the pending job order;

distributing the pending job order to the one or more encoding units;

receiving an encoded data file from each of the one or more encoding units; and storing each of the encoded data files into a storage unit for subsequent delivery to one or more customers.

2. A method for encoding digital information, comprising the computer-implemented steps of:

capturing media program information to produce a media program file;

receiving an encoding request from a client, wherein the encoding request requests that the media program information be encoded in one or more encoding formats;

selecting a set of encoding engines that can encode the media program information in each of the one or more encoding formats:

sending the media program file to the selected set of encoding engines; and using the selected set of encoding engines to encode said media program information in said one or more encoding formats;

wherein the step of capturing comprises the step of reading the media program information from a storage medium;

the medium further includes the steps of associating the media program file with a unique Master_ID;

wherein the step of receiving an encoding request from a client comprises the steps of:

causing a user interface to be displayed at the client, wherein the user interface allows users to enter encoding requests; and in response to a user interacting with said interface, receiving at a server an encoding request, wherein the encoding request includes said unique Master_ID;

wherein the step of receiving at a server an encoding request further includes the steps of:

generating an encoding order based on the encoding request;

determining a unique Job_ID, wherein the unique Job_ID is associated with the encoding order; and storing as a pending job order in an accessible storage unit, the encoding order and its association with the unique Job_ID.

3. A method for encoding digital information, comprising the computer-implemented steps of:

capturing media program information to produce a media program file;

receiving an encoding request from a client, wherein the encoding request requests that the media program information be encoded in one or more encoding formats;

selecting a set of encoding engines that can encode the media program information in each of the one or more encoding formats;

sending the media program file to the selected set of encoding engines; and using the selected set of encoding engines to encode said media program information in said one or more encoding formats, wherein:

the encoding request requests that the media program information be encoded in a plurality of encoding formats;

the step of selecting a set of encoding engines includes the step of selecting a set of encoding engines that can encode the media program information in the plurality of encoding formats; and the step of using said selected set of encoding engines includes the step of using said selected set of encoding engines to encode said media program information in said plurality of encoding formats in parallel.

4. A computer-readable medium carrying one or more sequences of instructions for encoding digital information, wherein execution of the one or more sequences of instructions by one or more processors causes the one or more processors to perform the steps of:

capturing media program information to produce a media program file;

receiving an encoding request from a client, wherein the encoding request requests that the media program information be encoded in one or more encoding formats;

selecting a set of encoding engines that can encode the media program information in each of the one or more encoding formats;

sending the media program file to the selected set of encoding engines; and using said selected set of encoding engines to encode said media program information in said one or more encoding formats;

wherein a distribution unit performs the steps of:

identifying an encoding order as a pending job order that needs to be processed;

identifying one or more encoding units that are available to process the pending job order;

distributing the pending job order to the one or more encoding units;

receiving an encoded data file from each of the one or more encoding units; and storing each of the encoded data files into a storage unit for subsequent delivery to one or more customers.

5. A computer-readable medium carrying one or more sequences of instructions for encoding digital information, wherein execution of the one or more sequences of instructions by one or more processors causes the one or more processors to perform the steps of:

capturing media program information to produce a media program file;

receiving an encoding request from a client, wherein the encoding request requests that the media program information be encoded in one or more encoding formats;

selecting a set of encoding engines that can encode the media program information in each of the one or more encoding formats;

sending the media program file to the selected set of encoding engines; and using said selected set of encoding engines to encode said media program information in said one or more encoding formats;

wherein: the step of capturing comprises the step of reading the media program information from a storage medium;

the computer-readable medium further comprising instructions for performing the steps of associating the media program file with a unique Master_ID;

wherein the step of receiving an encoding request from a client comprises the steps of:

causing a user interface to be displayed at the client, wherein the user interface allows users to enter encoding requests; and in response to a user interacting with said interface, receiving at a server an encoding request, wherein the encoding request includes said unique Master_ID;

wherein the step of receiving at a server an encoding request further includes the steps of:

generating an encoding order based on the encoding request;

determining a unique Job_ID, wherein the unique Job_ID is associated with the encoding order; and storing as a pending job order in an accessible storage unit, the encoding order and its association with the unique Job_ID.

6. A computer-readable medium carrying one or more sequences of instructions for encoding digital information, wherein execution of the one or more sequences of instructions by one or more processors causes the one or more processors to perform the steps of:

capturing media program information to produce a media program file;

receiving an encoding request from a client, wherein the encoding request requests that the media program information be encoded in one or more encoding formats;

selecting a set of encoding engines that can encode the media program information in each of the one or more encoding formats;

sending the media program file to the selected set of encoding engines; and using said selected set of encoding engines to encode said media program information in said one or more encoding formats;

wherein:

the encoding request requests that the media program information be encoded in a plurality of encoding formats;

the step of selecting a set of encoding engines includes the step of selecting a set of encoding engines that can encode the media program information in the plurality of encoding formats; and the step of using said selected set of encoding engines includes the step of using said selected set of encoding engines to encode said media program information in said plurality of encoding formats in parallel.

7. A system for encoding digital information, the system comprising;

a capturing unit that is capable of capturing media program information from a storage medium;

a storage unit that maintains captured media program information, program metadata that is based on the media program information, and encoding request information, wherein each encoding request identifies a set of one or more encoding formats that are to be sued to encode a particular media program;

a server connected to said storage unit, wherein the server is configured to receive encoding requests from clients that are connected to said server and to generate and store pending encoding orders in said storage unit based on said encoding requests;

a distribution unit that is configured to retrieve pending job orders from said storage unit and to distribute the orders to one or more encoding units;

wherein the encoding units are configured to encode in parallel job orders that request a specific media program to be encoded in multiple encoding formats.

8. The system claim 7, wherein the distribution unit performs the steps of:

identifying an encoding order as a pending job order that needs to be processed;

identifying one or more encoding units that are available to process the pending job order;

distributing the pending job order to the one or more encoding units;

receiving an encoded data file from each of the one or more encoding units; and storing each of the encoded data files into a storage unit for subsequent delivery to one or more customers.

* * * * *